(12) United States Patent
Reuber et al.

(10) Patent No.: US 12,397,480 B2
(45) Date of Patent: Aug. 26, 2025

(54) APPARATUS FOR THE MANUFACTURE OF A PARTICLE FOAM COMPONENT

(71) Applicant: Kurtz GmbH, Kreuzwertheim (DE)

(72) Inventors: Norbert Reuber, Bergrothenfels (DE); Constantin Kemmer, Marktheidenfeld (DE); Victor Romanov, Wertheim (DE)

(73) Assignee: Kurtz GmbH, Kreuzwertheim (DE)

( * ) Notice: Subject to any disclaimer, the term of this patent is extended or adjusted under 35 U.S.C. 154(b) by 363 days.

(21) Appl. No.: 16/464,149

(22) PCT Filed: Dec. 1, 2017

(86) PCT No.: PCT/EP2017/081183
§ 371 (c)(1),
(2) Date: May 24, 2019

(87) PCT Pub. No.: WO2018/100154
PCT Pub. Date: Jun. 7, 2018

(65) Prior Publication Data
US 2020/0307041 A1   Oct. 1, 2020

(30) Foreign Application Priority Data

Dec. 1, 2016 (DE) .................. 10 2016 123 214.9

(51) Int. Cl.
*B29C 44/34* (2006.01)
*B29C 35/08* (2006.01)
(Continued)

(52) U.S. Cl.
CPC ...... *B29C 44/3415* (2013.01); *B29C 35/0805* (2013.01); *B29C 44/445* (2013.01);
(Continued)

(58) Field of Classification Search
CPC ......... B29C 33/06; B29C 33/08; B29C 44/58; B29C 44/3415; B29C 35/0805; B29C 35/12

See application file for complete search history.

(56) References Cited

U.S. PATENT DOCUMENTS 3,060,513 A    10/1962   Klink et al.
3,193,874 A *  7/1965   Jablonski ............ B29C 44/3415
                                                        425/444
(Continued)

FOREIGN PATENT DOCUMENTS

CH         472959      5/1969
CN       1621212 A     6/2005
(Continued)

OTHER PUBLICATIONS

International Search Report, mailed on Aug. 6, 2018, from International Application No. PCT/EP2017/081183, filed on Dec. 1, 2017. 13 pages.
(Continued)

*Primary Examiner* — Alison L Hindenlang
*Assistant Examiner* — Alexander A Wang
(74) *Attorney, Agent, or Firm* — HoustonHogle LLP (57) ABSTRACT

The invention relates to an apparatus for the manufacture of a particle foam component, said apparatus comprising
a molding tool limiting a molding space, wherein, adjacent to the molding space, at least two capacitor plates are arranged which are connected to a radiation source for electromagnetic radiation, wherein the radiation source for electromagnetic radiation is designed for emitting electromagnetic radiation, and
wherein the molding tool is formed of at least two molding halves, wherein at least one of the molding
(Continued)

halves is made from an electrically conducting material and forms one of the capacitor plates.

19 Claims, 5 Drawing Sheets

(51) Int. Cl.
*B29C 44/44* (2006.01)
*B29C 44/58* (2006.01)
*B29K 101/12* (2006.01)

(52) U.S. Cl.
CPC ...... *B29C 44/58* (2013.01); *B29C 2035/0861* (2013.01); *B29K 2101/12* (2013.01)

(56) References Cited

U.S. PATENT DOCUMENTS

| | | | |
|---|---|---|---|
| 3,242,238 | A | 3/1966 | Edberg et al. |
| 3,264,381 | A | 8/1966 | Stevens |
| 3,331,899 | A | 7/1967 | Immel |
| 3,843,304 | A | 10/1974 | Sigal |
| 4,266,928 | A | 5/1981 | Weidner et al. |
| 4,372,738 | A | 2/1983 | Black et al. |
| 4,574,289 | A | 3/1986 | Henderson |
| 4,634,963 | A | 1/1987 | Lunden |
| 4,851,167 | A | 7/1989 | Marc |
| 5,082,436 | A | 1/1992 | Choi et al. |
| 5,128,073 | A | 7/1992 | Allen et al. |
| 5,248,459 | A | 9/1993 | Fukasawa et al. |
| 5,332,384 | A | 7/1994 | Abramat |
| 5,360,330 | A | 11/1994 | Jensen et al. |
| 5,629,981 | A | 5/1997 | Nerlikar |
| 5,711,905 | A * | 1/1998 | Behl ................ B29C 44/3426 264/102 |
| 5,973,308 | A | 10/1999 | Sternowski |
| 6,220,842 | B1 | 4/2001 | Kamiyama et al. |
| 6,275,196 | B1 | 8/2001 | Bobier |
| 7,023,356 | B2 | 4/2006 | Burkhardt et al. |
| 7,144,534 | B2 | 12/2006 | Buchel et al. |
| 7,367,497 | B1 | 5/2008 | Hill |
| 2001/0036814 | A1 | 11/2001 | Bobier |
| 2002/0130432 | A1 | 9/2002 | Lukas et al. |
| 2003/0101253 | A1 | 5/2003 | Saito et al. |
| 2003/0224082 | A1 | 12/2003 | Akopyan |
| 2005/0225444 | A1 | 10/2005 | Clift et al. |
| 2006/0279014 | A1 | 12/2006 | Balchin et al. |
| 2011/0187493 | A1 | 8/2011 | Elfstrom et al. |
| 2012/0056345 | A1 | 3/2012 | Lee |
| 2012/0154115 | A1 | 6/2012 | Herrala |
| 2013/0099089 | A1 * | 4/2013 | Chang ................ B29C 33/38 249/78 |
| 2013/0176107 | A1 | 7/2013 | Dumas et al. |
| 2014/0005287 | A1 * | 1/2014 | Itoi ................ C08J 9/18 521/143 |
| 2014/0243442 | A1 | 8/2014 | Coles et al. |
| 2015/0154844 | A1 | 6/2015 | Skaaksrud |
| 2016/0055693 | A1 | 2/2016 | Somani et al. |
| 2016/0063783 | A1 | 3/2016 | Bruns et al. |
| 2016/0104334 | A1 | 4/2016 | Handville et al. |
| 2016/0284147 | A1 | 9/2016 | Trani |
| 2016/0311133 | A1 | 10/2016 | Metaverso |
| 2017/0069149 | A1 | 3/2017 | Scheja et al. |
| 2017/0104271 | A1 | 4/2017 | Perottino |
| 2018/0308302 | A1 | 10/2018 | Al-Yousef et al. |
| 2021/0107187 | A1 | 4/2021 | Romanov |

FOREIGN PATENT DOCUMENTS

| | | |
|---|---|---|
| CN | 1791498 A | 6/2006 |
| CN | 103974813 | 8/2014 |
| DE | 735283 | 5/1943 |
| DE | 69021200 | 1/1996 |
| DE | 19829562 A1 | 1/2000 |
| DE | 19860611 C1 | 3/2000 |
| DE | 19921742 | 11/2000 |
| DE | 10009665 C1 | 1/2002 |
| DE | 10117979 | 8/2002 |
| DE | 202004003679 | 5/2004 |
| DE | 202006009569 | 8/2006 |
| DE | 102013110242 | 8/2014 |
| DE | 102014117332 | 6/2016 |
| DE | 202011109598 U1 | 4/2022 |
| EP | 1259365 | 9/2001 |
| EP | 1631428 B1 | 1/2007 |
| EP | 1990170 | 11/2008 |
| EP | 1990170 A2 | 11/2008 |
| EP | 2556938 | 2/2013 |
| EP | 2845705 | 3/2015 |
| GB | 641 842 | 8/1950 |
| GB | 1 403 326 | 8/1975 |
| JP | S 54144470 | 11/1979 |
| JP | H 02283429 | 11/1990 |
| JP | H 04261834 | 9/1992 |
| JP | H 06320634 | 11/1994 |
| JP | H 0740358 | 2/1995 |
| JP | 2000334763 | 12/2000 |
| TW | 201031512 A | 9/2010 |
| WO | WO 01/64414 | 9/2001 |
| WO | WO 2013/005081 | 1/2013 |
| WO | WO 2013/050581 | 4/2013 |
| WO | WO 2014/128214 | 8/2014 |
| WO | WO 2015091906 | 6/2015 |

OTHER PUBLICATIONS

Written Opinion, mailed on Aug. 6, 2018, from International Application No. PCT/EP2017/081183, filed on Dec. 1, 2017. 18 pages.
German Search Report mailed on Mar. 15, 2017, from German Application No. 10 2016 123 214.9, filed on Dec. 1, 2016. 5 pages.
Office Action, issued on Sep. 10, 2018, for Taiwanese Application No. 106142067, filed on Dec. 1, 2017. 26 pages.
International Preliminary Report on Patentability, mailed on Jun. 13, 2019, from International Application No. PCT/EP2017/081183, filed on Dec. 1, 2017. 33 pages.
German Search Report mailed on Mar. 16, 2018, from German Application No. 20 2017 107 149.9, filed on Nov. 24, 2017. 3 pages.
International Preliminary Report on Patenability, mailed on Jun. 4, 2019, from International Application No. PCT/EP2017/081210, filed on Dec. 1, 2017. 12 pages.
International Search Report, mailed on Jun. 13, 2018, from International Application No. PCT/EP2017/081210, filed on Dec. 1, 2017. 10 pages.
Written Opinion, mailed on Jun. 13, 2018, from International Application No. PCT/EP2017/081210, filed on Dec. 1, 2017. 14 pages.
Office Action, issued on Jun. 30, 2020, for Taiwanese Application No. 106142067, filed on Dec. 1, 2017. 16 pages.
Office Action, issued on Jun. 23, 2020, for Taiwanese Application No. 108116123, filed on Dec. 1, 2017. 14 pages.

* cited by examiner

APPARATUS FOR THE MANUFACTURE OF A PARTICLE FOAM COMPONENT

RELATED APPLICATIONS

This application is a § 371 National Phase Application of International Application No. PCT/EP2017/081183, filed on Dec. 1, 2017, now International Publication No. WO 2018/100154 A2, published on Jun. 7, 2018, which claims priority to German Application No. 10 2016 123 214.9, filed on Dec. 1, 2016, both of which are incorporated herein by reference in their entirety.

The present invention relates to an apparatus for the manufacture of a particle foam component.

WO 2013/05081 A1 discloses a method for the manufacture of particle foam components, wherein a mixture of foam particles and dielectric transfer fluid is heated up by means of electromagnetic waves to melt the foam particles to form a particle foam component. Radio waves and micro waves are used as electromagnetic waves. The material of the particle foam component is formed from polypropylene (PP).

U.S. Pat. No. 3,060,513 discloses a method for sintering of wet thermoplastic foam particles. The particles are heated up dielectrically and are compressed simultaneously in the mold. Electromagnetic waves at a frequency of approximately 2 to 1000 MHz are applied.

A similar method is described in U.S. Pat. No. 3,242,238, wherein foam particles are moistened with an aqueous solution and are exposed to an electromagnetic field with a frequency of approximately 5 to 100 MHz.

A method for welding of expandable polystyrene foam particles is described in GB 1,403,326, wherein the particles are moistened with an aqueous solution and are exposed to an electromagnetic field of 5 to 2000 MHz.

WO 01/64414 A1 discloses another method, wherein polymer particles made of polyolefins moistened with a liquid medium are heated up by means of electromagnetic waves, in particular microwaves. Here, the temperature in the molding tool is set by means of controlling the inside pressure.

Wet foam particles are respectively heated up by means of electromagnetic waves according to the methods as described above, wherein the electromagnetic energy is absorbed by the fluid and is transferred to the particles.

U.S. Pat. No. 5,128,073 discloses thermoplastic particles coated with a material capable of absorbing high frequency energy. These particles may be heated up by means of electromagnetic waves, wherein the coating gives up the electromagnetic energy and releases it to the foam particles. For welding the foam particles, electromagnetic waves in the range of 40 MHz to 2450 MHz are used.

These methods have been known for decades. However, they have not been successful in practice. This is due to different reasons. On laboratory samples, these methods work very well. However, the transition to industrial production so far has not been successful. An essential reason for this is that the heat cannot be uniformly introduced into the foam particles, so that no uniform welding of the particle foam component is obtained.

In practice, foam particles are thus almost exclusively welded by means of saturated dry steam, as it is, for example, known from WO 2014/128214 A1. The welding by means of electromagnetic waves was not able to establish itself against the welding with steam, although the welding with electromagnetic waves would have considerable advantages as a matter of principle. With electromagnetic waves, the energy could essentially be transferred in a more targeted manner, so that it would not be necessary to heat up auxiliary bodies. For using steam, the steam first has to be produced by a steam generator. Then, the steam must be supplied through lines to the tool. All of these parts have to be heated up to a sufficiently high temperature, so that the steam will not condense therein. This method causes a significant heat loss. Furthermore, the devices for generating steam and for guiding steam require most of the installation space of the apparatus for the manufacture of a particle foam component. If there would be no need of steam for the welding of the foam particles, then the whole apparatus could be made significantly more compact.

Therefore, the problem underlying the present invention is to provide an apparatus for the manufacture of a particle foam component which allows for efficient and reliable welding of expandable thermoplastic foam particles.

The problem is solved by the subject matters of the independent claims. Advantageous embodiments are indicated in the respective dependent claims.

According to a first aspect of the present invention, the apparatus for the manufacture of a particle foam component comprises
- a molding tool delimiting a molding space, wherein, adjacent to the molding space, at least two capacitor plates are arranged which are connected to a radiation source for electromagnetic radiation, the radiation source for electromagnetic radiation being designed for emitting electromagnetic radiation, and
- the molding tool is formed of at least two molding halves, with at least one of the two molding halves being formed from an electrically conductive material and forming one of the capacitor plates.

Due to the fact that one of the molding halves of the molding tool is formed from an electrically conductive material and forms one of the capacitor plates, said capacitor plate is in direct proximity to the molding space. Thus, losses are kept low and the electric power required for welding the foam particles is limited.

Preferably, the electrically conductive material is a metal, in particular aluminum, copper or a corresponding alloy. The molding half is contoured corresponding to the molding space. Such an electrically conductive molding half may differ from conventional capacitor plates by its contouring. Conventional capacitor plates have a planar shape.

It is also possible that both molding halves are formed from an electrically conductive material, each of them forming one of the capacitor plates, wherein at least in the region where the two molding halves are in contact with each other, an insulating layer for electric insulation of the two molding halves is applied.

Preferably, the electrically conducting molding half or halves is or are provided with a layer of plastic material on its side delimiting the molding space. Preferably, the layer of plastic material has a maximum thickness of 1 cm.

Preferably, the layer of plastic material is formed from a material which is not transparent to the electromagnetic radiation. Preferably, the material is chosen such that it has a loss factor similar to that of the foam particles to be welded. Thereby, a uniform heating up in the entire molding space is obtained, since the foam particles and the layer of plastic material which delimits the foam particles are uniformly heated up due to the electromagnetic radiation.

A filling injector may be coupled to the electrically conducting molding half or halves. Such a filling injector is, as a rule, formed from an electrically conducting material. The electrically conducting molding half connected to the filling injector is then, preferably, electrically connected to ground together with the filling injector.

According to a further aspect of the present invention, an apparatus for the manufacture of a particle foam component comprises:
- a molding tool which delimits a molding space, wherein, adjacent to the molding space, at least two capacitor plates are arranged which are connected to the radiation source for electromagnetic radiation, the radiation source for electromagnetic radiation being designed for emitting electromagnetic radiation, and
- wherein the molding tool is formed from at least two molding halves, with one of the molding halves having a passage opening for introducing the foam particles and/or a passage opening for allowing the air to escape, the passage opening being covered up by the other molding half in a closed state of the molding tool.

Due to the covering up of the passage opening by the respective other molding half, it is not necessary to provide the passage opening with a closing mechanism, since said passage opening is covered up by the other molding half and thus closed when the molding tool is in a closed state. To said passage, a filling injector may be connected which differs from conventional filling injectors in that it has no closing mechanism for closing the opening that leads into the molding space. Therefore, the filling injector can be made substantially simpler than in a conventional apparatus for the manufacture of particle foam elements.

The passage opening or passage openings, respectively, are preferably arranged on the molding half in a section which is covered up by the other molding half when the molding tool is in a closed state, and which is exposed when the molding tool is partly open, the two molding halves of the molding tool being still engaged when being in this partly open state and forming an enlarged molding space without openings—with the exception of the passage or passages—to the outside. In this partly open state of the molding tool, the molding space may be filled with foam particles which are unable to escape due to the closed geometry of the molding space. This partly open state of the molding tool forms a so-called crack-gap, which is why this state can also be defined as the crack-gap position of the molding tool.

According to a further aspect of the present invention, an apparatus for the manufacture of a particle foam component comprises:
- a molding tool delimiting a molding space, wherein, adjacent to the molding space, at least two capacitor plates are arranged which are connected to a radiation source for electromagnetic radiation, the radiation source for electromagnetic radiation being designed for emitting electromagnetic radiation, and
- the molding tool is formed of at least two molding halves, wherein at least one of the molding halves is formed from an electrically non-conducting material and has a degassing opening for allowing the air to escape, wherein the degassing opening is flush with the molding space by means of a degassing insert which is formed from an electrically non-conducting material or is arranged in parallel to the capacitor plates.

The degassing insert can be a plate-like element with small holes which are permeable to air, but not, however, to foam particles. As a rule, the foam particles have a diameter of 3 to 5 mm when fed into the molding tool. Therefore, the holes of the degassing insert are formed with a diameter of not more than 2 mm and, preferably, of not more than 1 mm. The degassing insert can be formed of plastic material. Such degassing inserts may be arranged anywhere on the molding tool or on the molding half, respectively. However, the degassing insert may also be formed from metal. For metallic degassing inserts, it is appropriate to use them at positions where they are arranged in parallel to the capacitor plates. Such a plate-like degassing insert which is, for example, arranged in parallel to the capacitor plates, has almost none or only little influence on the electric field generated by the capacitor plates, since the degassing insert extends more or less transversely to the field lines.

The degassing insert may also be formed from sintered, porous material. It may be a sintered plastic, ceramic or metal body. A sintered metal body is usable only in a limited way due to its influence on the field lines of the electric field.

The molding half may have several such degassing openings.

According to a further aspect of the present invention, an apparatus for the manufacture of a particle foam component comprises:
- a molding tool which delimits a molding space, wherein, adjacent to the molding space, at least two capacitor plates are arranged which are connected to the radiation source for electromagnetic radiation, the radiation source for electromagnetic radiation being designed for emitting electromagnetic radiation, and
- wherein, at least on one of the capacitor plates, one of the molding halves is fixed and this capacitor plate is fixed to a housing by means of several pressure-loadable insulation bodies, wherein at least one of the insulation bodies is arranged on a rear side and a further insulation body is arranged on a front side of the capacitor plate in such a way that both during opening and closing of the molding tool, the insulation bodies are exclusively loaded when subjected to pressure and not to tension.

Such insulation bodies are, as a rule, capable of absorbing high pressure. However, they are very sensitive to tension and can easily break. In particular, in case of molding tools of high volume, high compressive forces are generated during closing and in generation of the particle foam component, wherein the two molding halves are pressed against each other under high pressure, as well as considerable tensile forces during the opening of the molding tool. By such an arrangement of the insulation bodies, it is ensured that the latter are not inappropriately stressed and permanently hold the capacitor plate in a reliable manner.

Preferably, several insulation bodies are arranged between the capacitor plate and the housing in order to absorb the compression forces occurring during closing and operation.

Preferably, at least one further insulation body is provided for holding the one capacitor plate, with this further insulation body extending in one direction transversely to the opening or closing direction, respectively, of the molding tool. By means of this insulation body, forces that are laterally active on the capacitor plate are diverted to the housing.

The capacitor plate or plates is or are electrically connected to the radiation source, and the radiation source is adapted such that electromagnetic waves with an amplitude of at least 1 kV are applied to the capacitor plate. Electromagnetic waves with an amplitude of at least 5 kV or at least 10 kV or at least 20 kV, respectively, can be applied to the capacitor plate. According to a further aspect of the present invention, an apparatus for the manufacture of a particle foam component comprises:
- a molding tool which delimits a molding space, wherein, adjacent to the molding space, at least two capacitor plates are arranged which form a tool capacitor and are connected to the radiation source for electromagnetic radiation, the radiation source for electromagnetic radiation being designed for emitting electromagnetic radiation, wherein
a voltmeter for measuring the electric voltage at the tool capacitor is provided, the voltmeter being connected to a control device for controlling the electric power based on the measured voltage.

The electric voltage which actually drops on the capacitor allows a very precise estimate of the thermal output introduced into the plastic material, since the electric energy and thus the electric power is proportional to the square of the voltage. In this way, the electric power supplied to the foam particle can be controlled very precisely in a simple manner.

Preferably a voltage divider is provided, comprising an isolating capacitor and a measuring capacitor. These form a series connection, which is connected in parallel to the tool capacitor. The voltmeter taps the voltage at the measuring capacitor. The capacitance of the isolating capacitor is preferably less than the capacitance of the measuring capacitor. In particular, the capacitance of the isolating capacitor is not greater than $1/100$, preferably not greater than $1/1,000$ and in particular not greater than $1/10,000$ of the capacitance of the measuring capacitor. This means that the voltage across the measuring capacitor is a predetermined fraction of the voltage across the tool capacitor. This fraction is determined by the ratio of the capacitances of the isolating capacitor and the measuring capacitor.

Preferably connected parallel to the measuring capacitor is a diode which rectifies the voltage signal at the measuring capacitor.

The isolating capacitor has preferably a high electric strength and low electrical capacitance. The isolating capacitor may be formed on insulating bodies for attaching one of the capacitor plates to a housing of the apparatus, wherein the insulating body is arranged between two capacitor plates of the isolating capacitor.

According to a further aspect of the present invention, an apparatus for the manufacture of a particle foam component comprises:
a molding tool which delimits a molding space, wherein, adjacent to the molding space, at least two capacitor plates are arranged which are connected to the radiation source for electromagnetic radiation, the radiation source for electromagnetic radiation being designed for emitting electromagnetic radiation, and
the electromagnetic radiation source forming a generator resonant circuit and lines forming, together with the capacitor surrounding the molding space, a tool resonant circuit for guiding the electromagnetic waves, wherein at least one of the two resonant circuits is tunable by changing an inductivity or a capacitance, wherein a control device is provided designed in such a way that the power supply from the generator resonant circuit to the tool resonant circuit is controlled by tuning the tunable resonant circuit.

If the two resonant circuits have the same resonance frequency, then the maximum capacity is transferred from the generator resonant circuit to the tool resonant circuit. The more the resonance frequencies differ from each other, the lower is the power transfer. Thus, by changing the resonance frequency of one of the resonant circuits, the power transfer can be changed accordingly.

The inductivities of the two resonant circuits are above all influenced by the lengths of the circuit lines for transferring the electromagnetic waves. These lines generally are coaxial conductors or waveguides. By connection of additional line sections of various lengths, the inductivity and thus the resonance frequency of a resonant circuit can be changed. In the generator resonant circuit, a capacitor may also be provided where the distance of the capacitor plates may be varied in order to change the capacitance of the generator resonant circuit. Preferably, a motor is provided for adjusting the distance between the capacitor plates.

The maximum transferable power lies in the range between 25 kW to 60 kW. This depends on the dimensions of the generator and the lines by which the generator resonant circuit is connected to the tool resonant circuit.

According to a further aspect of the present invention, an apparatus for the manufacture of a particle foam component has a molding tool which delimits a molding space, wherein, adjacent to the molding space, at least two capacitor plates are arranged which are connected to a radiation source for electromagnetic radiation, wherein the radiation source for electromagnetic radiation is designed to emit electromagnetic radiation, and the molding tool has at least two molding halves, wherein at least one of the two molding halves is made at least partly of a composite material which has a matrix material made of plastic and bodies embedded in the matrix material, wherein the embedded bodies are made of a material which conducts heat better than the plastic matrix material.

The embedded bodies are preferably particles or fibers which are completely embedded in the matrix material. The particles have preferably a maximum size of 3 mm, in particular a maximum size of 2 mm or preferably a maximum size of 1 mm. The fibers have preferably a maximum length of 20 mm, in particular a maximum length of 10 mm and preferably a maximum length of 5 mm.

The matrix material is preferably made of a plastic which is not electrically conductive, for example an epoxy resin, in which the embedded bodies are completely enclosed. If the embedded bodies plus matrix material are separated from one another, then the embedded bodies may be made of an electrically conductive material. If the embedded bodies are made of an electrically conductive material then it is expedient for the embedded bodies to be fibers, arranged parallel to the respectively adjacent capacitor plate. If on the other hand the embedded bodies are not electrically conductive, then their arrangement in the matrix material may be as desired.

The embedded bodies are in particular made of mineral substances such as silica sand, a ceramic material, aluminum oxide, aluminum nitride, glass granules, frit, silicon carbide and/or magnesium oxide. The embedded bodies may also be glass fiber or carbon fiber. Carbon fibers are generally electrically conductive, for which reason they are preferably to be arranged parallel to the adjacent capacitor plate.

Magnesium oxide has a high thermal capacity, with which the molding tool can rapidly absorb the heat introduced into the particle foam component during welding, and the particle foam component cools down quickly.

The composite material comprising the matrix material and the embedded bodies included therein is preferably made of materials which do not or hardly absorb RF radiation. This composite material therefore does not influence the RF radiation or else only to a minimal extent. On account of the embedded bodies with their good thermal conductivity, however, the composite material can rapidly dissipate heat present in the molding space.

A molding half which has such a composite material is preferably provided on its side bordering the molding space with a coating which absorbs RF radiation more strongly than the composite material. Because of this, on the application of electromagnetic radiation, the molding half is heated in the area adjacent to the molding space, so that the foam particles present in the molding space may be heated evenly. In particular, this coating has a similar electrical loss factor to the foam particles to be welded by the molding tool.

The coating provided on the side of the molding tool bordering the molding space is preferably a plastic coating, which may be made of PET (polyethylene terephthalate) PEEK (polyether ketone), POM (polyoxymethylene), polyimide or PMMA (polymethyl methacrylate).

The apparatus for the manufacture of a particle foam component according to a further aspect of the present invention comprises a molding tool that limits a molding space, wherein adjacent to the molding space, at least two capacitor plates are arranged which are connected to a radiation source for electromagnetic radiation, wherein the radiation source for electromagnetic radiation is designed for emitting electromagnetic radiation, and the molding tool is formed of at least two molding halves, wherein at least one of the two molding halves is provided, on its side bounding the molding space, with areas which absorb electromagnetic radiation of differing strength so that, on the application of electromagnetic radiation, the area absorbing the stronger electromagnetic radiation heats up in such a way that in this area a surface of a particle foam component is more strongly melted than in the remaining area.

These areas which absorb electromagnetic radiation more strongly may be provided with the shape of a specific mark, logo or the like, so that this shape is impressed in the finished particle foam component by melting the surface of the particle foam component. In this way a marking may be provided on the particle foam component, without the need for a separate processing step.

The area of the molding tool which absorbs electromagnetic radiation more strongly may be made for example from a material with higher density than in the remaining area. This area may also be made alternatively or in combination with a material with greater thickness or from another material which in principle is better at absorbing electromagnetic radiation.

The apparatus for the manufacture of a particle foam component according to a further aspect of the present invention comprises a molding tool that limits a molding space, wherein adjacent to the molding space, at least two capacitor plates are arranged which are connected to a radiation source for electromagnetic radiation, wherein the radiation source for electromagnetic radiation is designed for emitting electromagnetic radiation, and the molding tool is provided with cooling ribs.

The provision of cooling ribs makes possible more rapid cooling of such a molding tool, in particular if a cooling air flow from a fan is directed on to the molding tool.

Such a molding tool preferably has two molding halves, which may be pressed together by means of a press to form the molding space, wherein each molding half has a pressing surface on which the press may act, and the cooling ribs are formed on the molding halves at areas outside each pressing surface.

The above-described aspects can be realized individually or also in any combination. For all of the above-described aspects it applies that the electromagnetic radiation can be RF radiation.

Furthermore, in all embodiments, one of the two capacitor plates can, as a general rule, be electrically connected to ground. The other capacitor plate is directly connected to the radiation source, with the radiation being transferred to this capacitor plate as electromagnetic waves against ground.

Preferably, the voltage measurement described above is used, in connection with the control of the power transmission by means of the adaptation of the generator resonant circuit and the tool resonant circuit, since the voltage is proportional to the matching of the two resonant circuits, i.e. that in case of a matching resonance frequency of the two resonant circuits, the voltage is highest and decreases all the more, the more the resonance frequencies of the two resonant circuits differ.

According to a further aspect of the invention, an apparatus for the manufacture of a particle foam component comprises:

a molding tool which delimits a molding space, wherein, adjacent to the molding space, at least two capacitor plates are arranged which are connected to the radiation source for electromagnetic radiation, the radiation source for electromagnetic radiation being designed for emitting electromagnetic radiation, and the apparatus comprising several work stations between which several molding tools are moved in a circuit, and wherein at least the following work stations are provided:

a filling station where the molding tool is filled with foam particles, a welding station where the foam particles present in the molding tool are welded by means of electromagnetic radiation, at least one or several cooling or stabilizing stations, respectively, for cooling the welded particle foam component, and a demolding station.

Preferably the conveyor unit is so designed that several molding tools may be conveyed in a circulatory movement.

The apparatus may have a cooling zone along the conveyor unit, while the cooling zone is designed to accommodate several molding tools at the same time.

Since the molding tool is often made of plastic material which is a poor heat conductor it is appropriate to have the particle foam component, after the welding, cool for a longer time before it can be demolded. With such an apparatus which moves the molding tool in a circuit the different work stations, in particular the welding station, can be operated at optimal capacity. One welding cycle lasts about 30 seconds to 2 minutes. The duration of the welding process depends on the size of the particle foam component, the material of the foam particle component and the introduced energy. In comparison with the conventional apparatuses for manufacturing particle foam components where the foam particles are exclusively welded by steam, the welding process is very short. Therefore, in comparison with conventional apparatuses, such a machine can be run at a significantly higher cycle rate. Only the cooling process generally takes more time than with conventional molding tools which are exclusively made from metals which are good heat conductors. With simultaneous use of several molding tools, these can be concurrently cooled at the stabilizing stations. The cooling can take place by the existing ambient air alone, or actively by supplying a gaseous or liquid coolant. At the individual stabilization stations, a different cooling system can be provided.

With the various apparatus models described above, a particle foam component may be manufactured, wherein the molding space is filled with foam particles and the foam particles located therein are welded by the application of electromagnetic radiation. The particle foam component manufactured in this way is then demolded.

The foam particles used for this purpose are made preferably of an expandable thermoplastic material.

A method for the manufacture of a particle foam component according to a further aspect of the present invention comprises the steps:
filling of a molding space with foam particles
welding of the foam particles, in particular through the application of electromagnetic radiation
demolding
wherein the molding tool has two molding halves, and these are arranged for filling the molding tool in a crack-gap position in which the molding halves are spaced somewhat apart from one another as compared with a closed position and are pressed together before welding with the foam particles loaded therein.

The method is characterized in that, in filling of the molding tool, the molding halves are in certain areas spaced apart at varying distances as compared with the closed position, so that on pressing together, the molding halves are moved together over different distances in certain areas.

By this means, the foam particles in the molding space are compressed with differing strength in the different areas of the molding tool. This makes it possible to obtain different densities in the closed state of the molding tool, or to equalize or compensate for variations in density due to different thicknesses in the molding space. If for example roughly wedge-shaped particle foam components for footwear are produced by the molding tool, then the resulting particle foam component is generally much thinner in a front section than in a rear section. If one molding half is pivoted around a swivel axis to create the crack-gap position, which is arranged transversely to the longitudinal extent of the mold at the thinner end of the mold then, on swiveling back into the closed position of the molding tool, a roughly constant density of the foam particles contained therein is obtained. This applies to all products which are wedge-shaped in cross-section.

There are however also other products with a thickness which varies in different ways. Here it is expedient to have at least one molding half which is made of two or more separate parts, which may be moved independently of one another to create a crack-gap position. This makes it possible for individual areas of the different parts of the molding half to be moved together over varying distances on being pressed together, leading to differences in the strength of compression of the foam particles contained therein.

This embodiment may also be used to compress areas of the molding space with different thickness as evenly as possible, in order to obtain the most even heating and quality of welding in the whole particle foam component. It may however also be expedient, if certain areas are to be heated more strongly, for greater compression to take place in these areas so that, on account of their greater density, the foam particles located therein absorb electromagnetic radiation more strongly. Consequently, during production of the particle foam components, it is possible to set a predetermined, non-constant temperature profile.

The invention is explained in more detail based on the drawing below. The drawing schematically shows in:

FIG. 1 an embodiment of an apparatus for the manufacture of a particle foam component, FIGS. 2*a*, 2*b* a respective molding tool in a partly open position (FIG. 2*a*) and in a closed position (FIG. 2*b*) in a sectional view, FIG. 3 a molding tool appropriate for manufacturing particle foam components of large volume, such as, e.g., insulation panels, in a sectional view, FIG. 4 a generator for electromagnetic radiation which forms a tunable resonant circuit, and the molding tool in an electric circuit diagram, and FIG. 5 a control device for controlling the power supply in a circuit diagram, and FIG. 6 an embodiment of an apparatus for the manufacture of a particle foam component in a perspective view.

Figure 1:
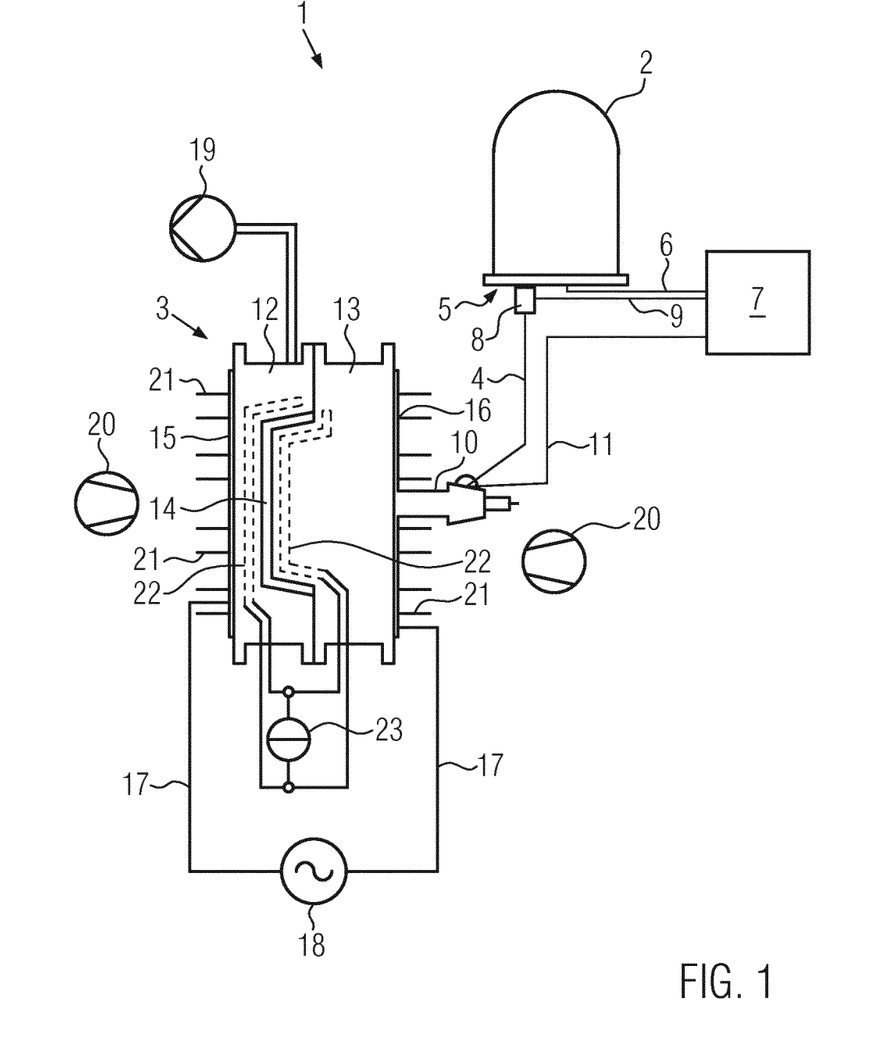

The basic setup of an apparatus 1 for the manufacture of a particle foam component is shown in FIG. 1. This apparatus 1 comprises a material container 2, a molding tool 3 and a conductor 4 which leads from the material container 2 to the molding tool 3.

The material container 2 serves to receive loose foam particles. The material container 2 has a base 5, whereby it is connected via a compressed air line 6 in the base area to a compressed air source 7. The compressed air line 6 is connected to several nozzles (not depicted) arranged in the base 5, so that several air steams (fluidizing air) can be injected into the material container 2 which cause the foam particles contained therein to swirl and thus to separate.

In the region of the base 5 of the material container 2, an opening is formed to which the feed line 4 is connected. The opening can be closed by means of a slide (not depicted). Adjacent to the material container, a jet nozzle 8 is present in the feed line 4. The jet nozzle 8 is connected to the compressed air source 7 via a further compressed air line 9. Compressed air supplied to this jet nozzle 8 serves as induction air, since it is introduced into the feed line 4 through the jet nozzle 8 and is conveyed to the molding tool 3. This generates a vacuum at the jet nozzle 8 at the side facing the material container 2, said vacuum absorbing foam particles from the material container.

The feed line 4 leads to a filling injector 10 coupled to the molding tool 3. The filling injector 10 is connected to the compressed air source 7 via a further compressed air line 11. The compressed air supplied to the filling injector 10 is, on the one hand, used for filling the molding tool 3 by applying compressed air to the flow of foam particles in the direction to the molding tool 3. On the other hand, the compressed air supplied to the filling injector 10 may also be used to blow back the foam particles from the feed line 4 into the material container 4, once the filling process is concluded.

The molding tool is formed of two molding halves 12, 13. Between the two molding halves, at least one molding space 14 is delimited to which the filling injector 10 for introducing the foam particles is connected. The volume of the molding space 14 can be reduced by bringing together the two molding halves 12, 13. When the molding halves 12, 13 are brought apart, a gap is formed between the molding halves 12, 13, said gap being designated as crack-gap. Therefore, such a molding tool 3 is also called a "crack-gap molding tool".

The apparatus 1 may not include a steam generator and a steam supply to the molding space 14, as is common with conventional apparatuses for the manufacture of particle foam elements. Humidity may penetrate into the molding space 14 due to the residual moisture contained in the material of the foam particles and due to the moisture contained in the compressed air. However, the apparatus 1 can also be configured with a steam generator and a steam supply to the molding space 14 and/or to the feed line 4, in order to feed saturated dry steam to the molding space 14 for heating the foam particles and/or to wet foam particles on their transport from the material container 2 to the molding space 14. Foam particles contained in the material container 2 may also be wetted with water in liquid form by appropriate nozzles atomizing the water and which are arranged for this purpose in the material container 2.

A capacitor plate 15, 16 is arranged on each of the molding halves 12, 13. These capacitor plates consist each of an electrically well-conducting material such as, for example, copper or aluminum. On the molding half 13, the filling injector 10 is arranged. The filling injector 10 extends through a recess in the capacitor plate 16 which is arranged on the molding half 13.

The capacitor plates 15, 16 are connected via electrical lines to a generator 18 for the transmission of high frequency voltages.

The molding halves 12, 13 each have a base body which can be made of a substantially electrically non-conducting material which is particularly transparent to electromagnetic RF radiation, such as, e.g., polytetrafluorethylene (PTFE), polyethylene, in particular UHMWPE, polyether ketones (PEEK). Only the capacitor plates 15, 16 are electrically conductive. The "substantially transparent material" is a material which can be permeated by electromagnetic radiation, in particular RF radiation. Nevertheless, this material may have a specific absorption property for electromagnetic RF radiation in order to transform a part of the electric RF radiation into heat and to heat the molding halves 12, 13. This will be explained in greater detail below.

The molding tool can optionally be connected to a vacuum pump 19, so that a negative pressure or vacuum, respectively, can be applied to the molding space 14. Said negative pressure leads to removal of the humidity contained in the molding space 14.

Preferably, the capacitor plates 15, 16 are provided with a cooling system. In the present embodiment, the cooling system is formed by fans 20 which guide the cooling air to the side of the capacitor plates 15, 16 which faces away from the molding space 14. For increasing the cooling effect, cooling fins can be provided on the capacitor plates 15, 16.

Alternatively or additionally, also cooling pipes can be arranged at the capacitor plates 15, 16 through which a cooling medium is conveyed. As cooling medium, preferably a fluid is used, such as, e.g., water or oil.

Such a method for the manufacture of particle foam components with the above-described apparatus is explained below.

The method comprises the following basic steps:
filling of the molding space 14
welding of the foam particles
stabilizing (optional)
demolding
cleaning of the tool (optional)

For filling the molding space 14, air is blown into the molding space 14 in the area of the base 5 of the material container via the compressed air line 6 so that the foam particles contained therein are swirled and isolated. At the same time, induction air is supplied to the jet nozzle, so that foam particles are taken in from the material container 2 into the feed line 4 and transported by the induction air towards the molding tool 3. The molding space 14 is closed, and the molding halves 12, 13 can be completely brought together or be spaced from each other by a crack-gap.

The slide of the material container 2 can be consecutively opened and closed. The opening and closing times typically lie in the range of 500 ms to 1 s. By means of this cyclical opening and closing of the slide, the foam particles from the material container 2 are intermittently conveyed to the feed line 4. By this means, any bridging of the foam particles in the material container 2 is prevented and the foam particles are separated. This is particularly appropriate in the case of foam particles having an adhesive surface, such as, e.g., eTPU foam particles.

An intermittent intake can alternatively also take place by an intermittent supply of induction air from the compressed air line 9 to the jet nozzle 8 which is arranged directly adjacent to the material container 2.

The molding tool 12, 13 is provided with at least one valve (not depicted) which is open during the feeding of the foam particles, so that the compressed air flowing into the molding space 14 can escape. This valve can be adjusted during the filling of the molding space 14 in such a way that a counter pressure is built up in the molding space 14. Thus, the pressure in the feed line and in the molding space can be kept high, whereby the foam particles are kept at a low volume. This makes it possible that more foam particles are fed to the molding space 14 than would have been possible without applying the counter pressure. Once the counter pressure is withdrawn, the foam particles expand in the molding space 14.

A further parameter for adjusting the filling quantity is the crack-gap, i.e. the gap defining the distance at which the two molding halves 12, 13 are arranged during the filling. The use of a crack-gap during filling mainly increases the density in a low-density region of the particle foam component to be manufactured.

Once it is established that the molding space 14 is filled with foam particles, the filling injector 10 is closed. The foam particles present in the line are blown back into the material container 2 by means of the compressed air supplied to the filling injector 10.

The filling of the molding space 14 with foam particles is described at length in German patent application DE 10 2014 117 332, which is why reference to this patent application is made in this respect.

After filling the molding space 14 with foam particles, these are heated by applying electromagnetic RF radiation. This RF radiation is generated by applying a high frequency voltage of approx. $10^4$V with a frequency of 27.12 MHz to the capacitor plates 15, 16.

The foam particles can be made on a polyurethane (eTPU) basis. Polyurethane has a dielectric loss factor D of 0.2 at an electromagnetic radiation with a frequency of 1 MHz. The dielectric loss factor of polypropylene (PP) at an electromagnetic radiation with a frequency of 1 MHz, however, is only 0.00035. The absorption capacity of polyurethane is therefore significantly higher than that of polypropylene. This makes it possible that without substances transmitting additional heat, in particular aqueous solutions, the heat necessary for welding the foam particles is introduced into the molding space 14, since the foam particles themselves absorb the electromagnetic waves.

Instead of foam particles on the basis of polyurethane, foam particles made of expandable thermoplastics on the basis of polyether-block-amide (ePEBA), on the basis of polylactide (PLA), on the basis of polyamide (ePA), on the basis of polybutylene terephthalate (ePBT), on the basis of polyester ether elastomer (eTPEE) or on the basis of polyethylene terephthalate (ePET) can be used.

These materials possess functional groups (amide groups, urethane group or ester group), which effect a dipole moment. These functional groups are responsible for the absorption of the RF radiation by the molecules. Therefore other thermoplastic plastics possessing such dipole moment-effecting groups are also suitable to be welded by RF radiation.

Foam particles based on ePP (expandable polypropylene) or ePS (expandable polystyrene) can also be welded into particle foam components. Since these materials absorb electromagnetic radiation only to a very low extent, it is necessary to add a dielectric heat transfer medium, such as, e.g., water. The foam particles can be wetted by the heat transfer medium in the material container 2 or during their transport from the material container 2 to the molding tool 3. A wetting in the feed line 4 has the advantage that the foam particles are wetted very uniformly and that the heat transfer medium is distributed homogenously in the molding space 14. This leads to a correspondingly uniform heating of the foam particles in the molding space 14.

The molding tool 3 can also be connected to a steam source (not depicted) by which saturated dry steam can be introduced into the molding space 14. This is appropriate when materials are welded which have a temperature-dependent dielectric loss factor. Such materials are, for example, ePES (expandable polyethersulfone) or expandable polyamide. At low temperatures, the absorption capacity of electromagnetic waves is low. For this reason, these foam particles are first heated by means of steam and then, after a specific temperature has been reached, are heated alone or additionally by means of electromagnetic radiation to still higher temperatures. Alternatively, the foam particles can be wetted with a dielectric heat transfer medium, so that the electric heat transfer medium is heated by means of electromagnetic radiation in order to heat the foam particles to a predetermined temperature. Thereupon, a direct heating of the foam particles based on the electromagnetic radiation can take place, since with a rising temperature, the absorption properties of electromagnetic radiation increase.

The duration of time for which the electromagnetic RF radiation is applied depends on the volume of the molding space 14, on the density of the foam particles as well as on the applied electric power or the applied electric voltage, respectively. In tests is has been shown that, depending on the volume and the material from which the foam particles are formed, approx. 30 s to approx. 2 min are needed for a reliable and complete welding of the foam particles. For this, an electric voltage of 5 kV to 20 kV was applied.

Preferably, the temperature of the foam particles is measured during welding and the electric power is controlled accordingly. Preferably, the electric power is controlled such that the foam particles have a temperature slightly above their softening temperature. Instead of the temperature of the foam particles, any other physical quantity that is related to the electric power introduced into the molding space may also be measured. This may be, for instance, the electric power applied to the capacitor plates 15, 16.

The surface limiting the molding space 14 can be additionally tempered. For this, heating wires 34 can be arranged adjacent to the surface limiting the molding space 14 in the molding tool. The heating wires 34 are connected to a power source 35 by which a heating current can be fed into the heating wires.

Instead of heating wires, fluid channels can also be provided in the molding halves 12, 13 through which a suitably tempered fluid flows. Preferably, the fluid is water or steam, respectively.

After applying the electromagnetic RF radiation, the molding space 14 is kept closed for a predetermined time, whereby the introduced heat is distributed evenly in the particle foam component and creates a very homogenous welding among all foam particles. This step is called stabilization. During stabilizing, a minor cooling-off of the particle foam component also takes place. Since the molding halves 12, 13 are formed from a material substantially transparent to electromagnetic RF radiation which generally is a plastic material that conducts heat poorly, as a rule, little heat is released to the exterior when the molding space 14 is closed.

Molding halves 12, 13 made from plastic material have, compared to molding halves made of metal, the advantage that, on the one hand, they insulate thermally significantly better and, on the other hand, have a lower heating capacity. Therefore, the desired temperature cycles can be carried out significantly faster and with less energy, with the supplied heat being almost completely supplied to the foam particles.

During stabilization or during a part of the duration time of stabilization, the capacitor plates 15, 16 can be actively cooled by the cooling system 32, 33, whereby heat is removed from the base bodies of the molding halves 12, 13 and thus also from the particle foam component.

After stabilization, the particle foam component is demolded by bringing the two molding halves 12, 13 apart from each other. At the molding tool, demolding tappets can be provided for demolding, by means of which the particle foam component is pushed out of one of the two molding halves 12, 13.

Stabilization is an optional process step. In cases of specific materials and shapes, it may also be omitted. The larger the volume of the particle foam component to be manufactured, the more appropriate it is to stabilize the particle foam component in the molding tool after welding.

In order to increase the throughput, the electromagnetic RF radiation can already be applied during filling and/or during the closing of a crack-gap.

The electromagnetic radiation, in particular the RF radiation, can be applied, first with low electric power or low electric voltage, respectively, already during filling or also only after filling of the molding space 14 with foam particles in order to pre-heat the material to a specific temperature and to then increase the electric power or the electric voltage, respectively, gradually or abruptly.

It may also be useful to gradually increase the power or voltage, respectively, of the electromagnetic RF radiation, so that a ramp is created over a time of, e.g., 30 seconds to 3 minutes by the gradual increase of the electric power or voltage, respectively, of the electromagnetic RF radiation. In this way, a homogenous heating of the form particles is achieved.

Optionally, also a negative pressure and/or vacuum can be applied to the molding space 14. This is useful if the foam particles and/or the supplied compressed air have a certain moisture content.

Compared to the welding done exclusively with steam, the method described above is a dry method. As a result, the manufactured particle foam components are dry or drier, respectively, after the manufacturing process and are more quickly ready for immediate further processing steps. It may also be expedient to demould the hot particle foam components and feed them immediately to a further processing step. Therefore, a considerable efficiency increase can be achieved in production, since, on the one hand, the intervals between the different processing steps can be shortened, and, on the other hand, the heat brought in for welding the foam particles can also be used, at least partly, for the subsequent process steps.

Below, a molding tool 3 (FIG. 2*a*, FIG. 2*b*) is explained which comprises a first molding half 12 and a second molding half 13, respectively, and which can be used in the above-described apparatus 1. Moving devices, fixing elements, thermometers for measuring the temperature in the molding space and further mechanical parts for opening and closing the tool are omitted in order to simplify the graphic representation in FIGS. 2a, 2b.

Figure 2A:
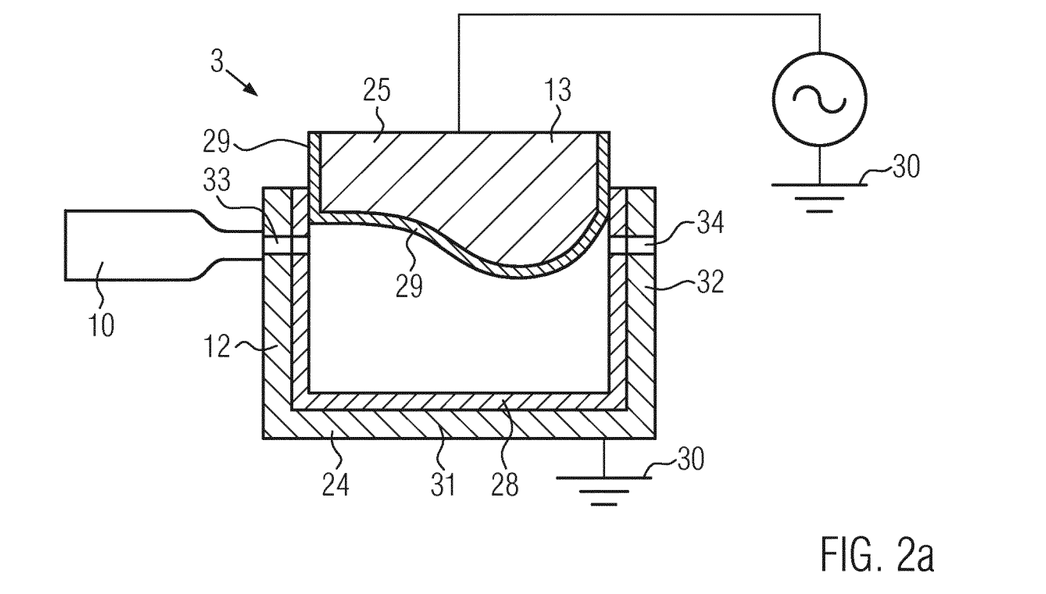
Figure 2B:
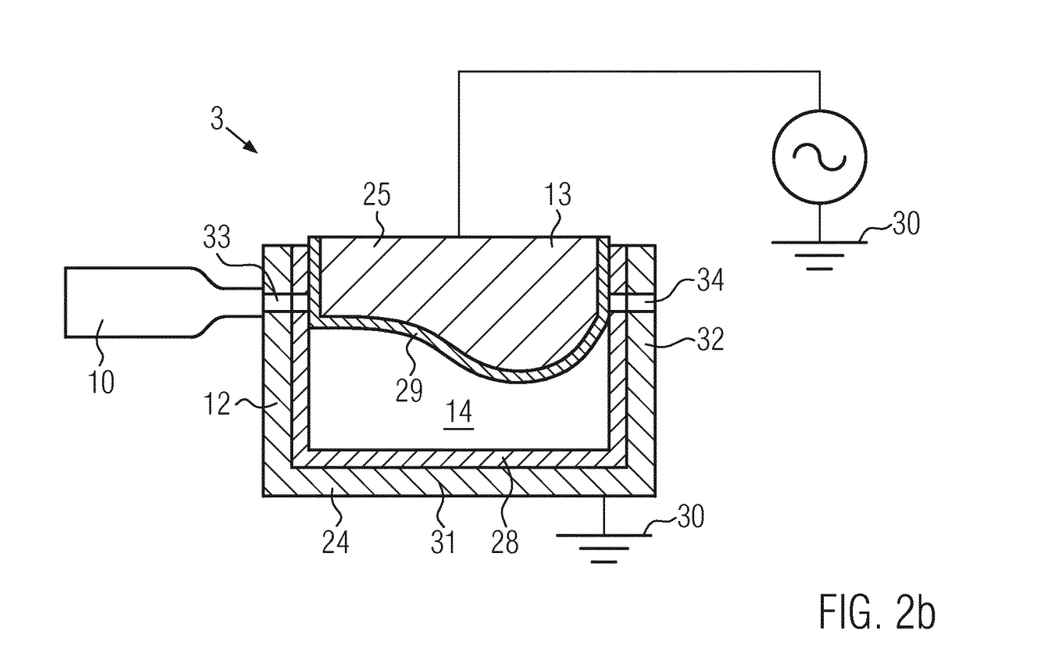

The molding tool 3 is made of two molding halves 12, 13, of which each has a base body 24, 25 made from an electrically conducting material. These base bodies consist, for example, of aluminum, copper or an alloy with good electrical conductivity.

The two molding halves 12, 13 each delimit a molding space 14 by an inner boundary surface 26, 27. The inner boundary surfaces 26, 27 of the two molding halves 12, 13 are provided with an electrically insulating coating 28, 29.

The electrically insulating coatings can be made from a material which is essentially transparent to electromagnetic radiation, in particular RF radiation, said material being, for example, PTFE, PE, PEEK. However, they may also be made from a plastic material which, with the applied electromagnetic radiation, has a similar dielectric loss factor to the plastic material to be processed in the molding space 14, so as to achieve a homogenous heating over the entire molding space 14 and in the edge portion of the molding space, when applying the electromagnetic radiation. For this reason, the coating 28, 29 is preferably made from a material having a moderate loss factor, such as, e.g., PET (polyethylene terephthalate), PEEK (polyether ketone), POM (polyoxymethylene), polyimides and PMMA (polymethylmethacrylate). These coatings 28, 29 are thus essentially transparent to RF radiation, since they absorb only a small part of the electromagnetic radiation and may, due to the relatively low loss factor, be formed with a certain thickness of, for example, at least 2 mm, in particular of at least 2.5 mm or at least 5 mm. Preferably, the coating is not thicker than 20 mm, in particular not thicker than 15 mm and preferably not thicker than 10 mm, so that the part of the energy of the electromagnetic waves absorbed by the coating is small.

The electrically conductive base bodies 24, 25 constitute the capacitor plates of the molding tool 3. Therefore, they have an electrical connection for being connected to the generator 18 or to ground 30. The generator 18 constitutes a radiation source for generating electromagnetic radiation. Preferably, the generator is configured for generating RF radiation. The generator may also be configured for generating microwaves, wherein, in case of larger molding spaces 14, a significantly more homogenous heating is possible with RF radiation than with microwave radiation. In addition, most plastic materials are able to absorb RF radiation far better than microwave radiation. For this reason, the use of RF radiation is preferred.

Due to the fact that the molding halves 12, 13 delimit both the molding space 14 and concurrently constitute the capacitor plates, the distance between the "capacitor plates" and the molding space 14 is very small and is solely defined by the electrically insulating coatings 28, 29. Due to this, the losses of electromagnetic radiation are very small, which is why the part of the power brought into the foam particles to be welded is very high. Such a tool thus allows a very efficient welding of the foam particles into a particle foam component.

In the present embodiment of molding tool 3, the first molding half 12 comprises a bottom wall 31 and a circumferential side wall 32. In the present embodiment, both the bottom wall 31 and the side wall 32 are formed by the electrically conductive base body 24 and the inner coating 28. It is also possible that the side wall 32 alone is formed from an electrically non-conducting material, particularly plastic material, or is only partly formed by means of the electrically conductive base body 24. The second molding half 13 forms a die which can drive into the cavity built by the first molding tool 12 and thus tightly seals the molding space 14. The tight seal between the two molding halves 12, 13 is at least so tight that foam particles contained therein cannot escape. The molding space 14 is not necessarily sealed gas-tight.

The two molding halves 12, 13 can be moved relative to each other by means of a press (not depicted), and a predetermined force can be applied to them.

At the first molding half 12, a passage opening for feeding foam particles is provided which is designated below as filling opening 33. To the filling opening 33, the filling injector 10 is connected. This filling injector differs from conventional filling injectors, since it has no closing mechanism for closing the filling opening 33, as will be explained in more detail below.

The first molding half 12 has one or several passage openings for allowing the air to escape, said passage openings being designated as ventilation openings 34 below.

The filling opening 33 and the ventilation openings 34 are arranged in a section or region, respectively, in particular in an edge region of the first molding half 12 being hidden or covered, respectively, by the second molding half 13 in the closed state of the molding tool 3 (FIG. 2b). Thereby, the filling opening 33 and the ventilation opening 34 are automatically closed at the closing of the molding tool 3 by the introduction of the second molding tool 13 into the cavity formed by the first molding tool 12. Due to this, it is not necessary that the filling injector 10 has a closing mechanism by means of which the filling opening 33 is closed.

This section or area is the area of the first molding half 12 which is not covered by the second molding half 13, i.e. the area around which the molding halves are opened into the crack-gap position on moving apart.

Preferably, the first molding half 12 is connected to ground 30. The filling injector 10 is coupled to the electrically conductive base body 24 of the first molding half 12, so that the injector 10 is also electrically connected to ground 30. The generator generates electromagnetic waves or an electric alternating voltage against ground 30 which is applied to the base body 25 of the second molding half 13. Thus, an electromagnetic alternating field, in particular RF radiation, is formed in the molding space 14.

In such an embodiment of the molding tool 3 it is important that the electrically conductive base bodies 24, 25 of the two molding halves 12, 13 are electrically insulated from each other. In the present embodiment, this is achieved by means of the coatings 28, 29.

Preferably, the inner boundary surface 26, 27 of one of the two molding halves 12, 13 has a contoured configuration. In the sense of the present invention, contoured means any form which deviates from a planar boundary surface. In the present embodiment, the inner boundary surface 27 of the second molding half 13 is contoured. The inner boundary surface 26 of the first molding half 12 is not contoured in the region of the bottom wall 31.

Such a molding tool 3 furthermore differs from known molding tools for welding foam particles by means of electromagnetic waves in that the second molding tool 13 has a die shape and is, with its electrical base body 25, at least partly within the cavity delimited by the first molding half 12, the electrically conductive base body 25 functioning as capacitor plate thus being very close to the molding space 14 or the foam particles to be welded, respectively.

Figure 3:
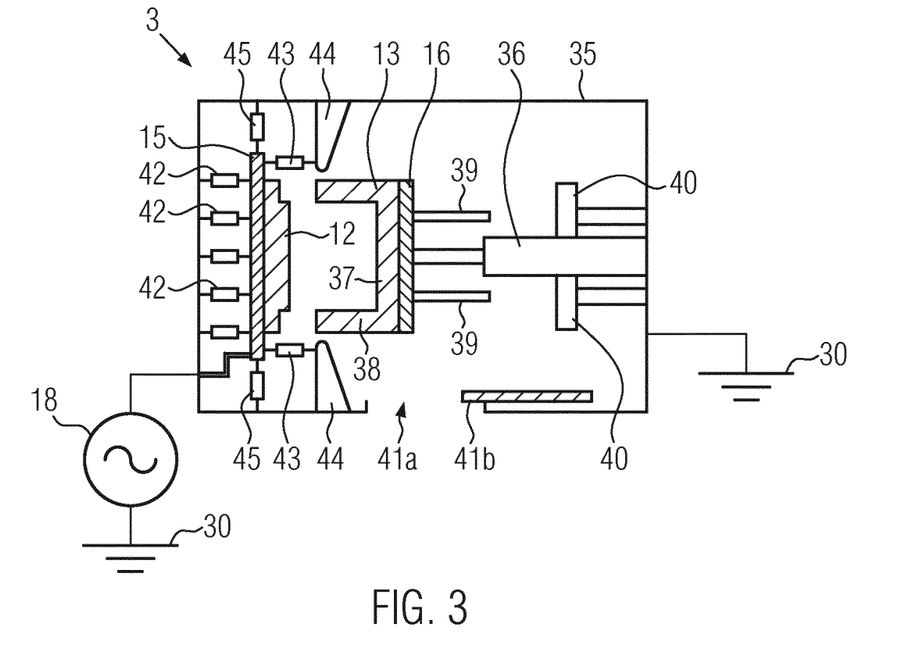

A further embodiment of the molding tool 3 is schematically represented in FIG. 3. Said molding tool 3 comprises two substantially planar capacitor plates 15, 16. One of the molding halves 12, 13 is fixed to each of both capacitor plates 15, 16. As shown in the embodiment represented in FIG. 1, the molding halves are made from an electrically non-conducting material. With regard to the configuration of the molding halves 12, 13 and the materials from which the molding halves are made, reference is made, in order to avoid repetitions, to the explanations regarding the molding halves shown in FIG. 1.

Said molding tool 3 has a housing 35 made from an electrically conducting material. Preferably, the housing is a metal housing.

In the housing, the first capacitor plate 15 and the first molding half 12 are mounted immovably. The second capacitor plate 16 and the second molding half 13 are coupled to a movement mechanism which, in the present embodiment, is a hydraulic piston/cylinder unit 36. The movement unit may also be a pneumatic piston/cylinder unit or a different control element which can apply the necessary force to keep the two molding halves 12, 13 together. The first molding half 12 is essentially plate-shaped, and the second molding half 13 has a bottom wall 37 and a circumferential side wall 38, so that it delimits a molding space open on one side.

The second molding half 13 is provided with the tappets 39 which can be driven into said molding half 13 for demolding the molding cavity. The demolding is carried out such that during the retracting of the second molding half 13 by means of the piston/cylinder unit 36, the tappets 39 get in contact with stop plates 40 and thus penetrate into the molding cavity delimited by the second molding half 13. At its bottom, the housing 35 has an opening 41a which can be closed by means of a horizontally movable door 41b. When the second molding half 13 is retracted, the door 41b is opened, so that the respective demolded particle foam component falls out of the molding tool 3 through the open opening 41a and can be removed by using appropriate means of conveyance (not depicted).

The second, movable capacitor plate 16 is electrically connected to ground 30 via the movement mechanism and via the housing 35.

The first capacitor plate 15 is electrically connected to the generator 18 by means of appropriate waveguides or coaxial lines, respectively.

The first capacitor plate 15 is immovably connected to a rear wall of the housing 35 by means of several mechanical connections. Each mechanical connection has an insulating body 42. The mechanical connections or insulating bodies 42, respectively, extend more or less in parallel to the movement direction of the second molding tool 13. In the present embodiment, the insulating body is made from ceramic material. However, other electrically well-insulating materials such as, for instance, glass may also be provided as materials for the insulating bodies. The insulating bodies 42 can support pressure loads. However, they are sensitive to lateral forces and tensile stress. On the rear side of the first capacitor plate 16, which is the side averted from the molding half 12, there is a plurality of mechanical connections each having an insulating body 42 between the capacitor plate 15 and the rear wall of the housing 35.

These mechanical connections are preferably arranged in a regular raster enabling them to support a high pressure load distributed over the individual mechanical connections or the individual insulating bodies 42, respectively, and to transfer said pressure load to the housing 35.

Furthermore, on the front side of the capacitor plate 15, i.e. on the side where the molding half 12 is positioned, some mechanical connections with further insulating bodies 43 are arranged in the edge region. The insulating bodies 43 are formed exactly like the insulating bodies 42. These mechanical connections extend between the edge region of the capacitor plate 15 and mounts 44 projecting inward from walls of the housing 35, so that these mechanical connections or insulating bodies, respectively, also extend more or less in parallel to the movement direction of the second molding half 13. Thus, when the molding tool is opened, the forces acting on the first molding tool 12 or the first capacitor plate 15, respectively, can be transferred to the housing 35.

Furthermore, additional mechanical connections can be provided which are formed transversely to the movement direction of the second molding half 13 or the second capacitor plate 16, respectively, which in turn comprise insulating bodies 45, in order to be able to transfer to the housing 35, in case of maintenance work or mounting, forces which are applied to the first capacitor plate 15 and which are not in parallel to the movement direction of the second capacitor plate 16 or the second molding half 13, respectively.

Since all mechanical connections between the first capacitor plate 15 and the housing 35 comprise an insulating body 42, 43, 45, the first capacitor plate 15 is completely insulated against the housing 35. Preferably, the insulating bodies 42, 43 and 45 have a length of at least 5 cm, in particular of at least 8 cm and, particularly preferred, of at least 10 cm, so that a suitably large distance between the housing 35 and the first capacitor plate 15 is established in order to avoid voltage flashovers between the capacitor plate 15 and the housing 35.

To a capacitor plate arranged in this way, electric voltages of 1 kV up to a few kV or up to 10 kV or several 10 kV, respectively, may be applied. A molding tool 3 formed in such a way is appropriate for transferring power in the range of 10 kW to 60 kW to the foam particles present in the molding space. Thus, particle foam components of large volume can be reliably manufactured with very short cycle times of 30 seconds to 2 minutes.

Figure 4:
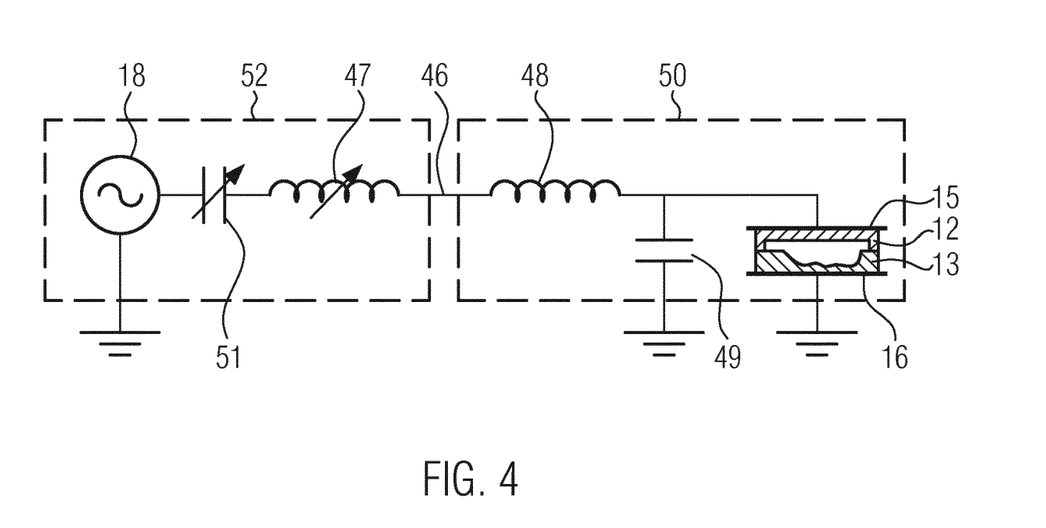

FIG. 4 schematically shows in an electric diagram the generator 18, the tool capacitor formed by the capacitor plates 15, 16 which encloses the molding halves 15, 16, and a line appropriate for transmitting electromagnetic waves (hollow waveguide or coaxial line, respectively) 46, by means of which the electromagnetic waves are transmitted from the generator 18 to the tool capacitor 15, 16. Preferably the hollow waveguide forming the line 46 is a coaxial air line with an electrically conductive inner tube and an electrically conductive outer tube. The coaxial air line is so dimensioned that high-voltage signals may be transmitted reliably. The surge impedance is set preferably at around 50Ω.

In said line 46, a generator-side inductivity 47 and a tool-side inductivity 48 are symbolically shown. These inductivities are caused by the line itself, wherein the length of the respective line sections determines the amount of the respective inductivity. A tool-side capacitor is switched in parallel to the tool capacitor 15, 16. Said capacitor 49 constitutes the electric capacity between the capacitor plate 15 and the housing 35 of the molding tool 3. The tool capacitor 15, 16, the capacitor 49 and the tool-side inductivity 48 form a tool resonant circuit 50.

A generator-side capacitor 51 is connected to the generator 18 and the generator-side inductivity. The generator-side capacitor 51 and the generator-side inductivity form a generator resonant circuit 52. At least the generator-side capacitor 51 or the generator-side inductivity 47 is of a variable form, for example, in that a capacitor with capacitor plates that are variable with regard to distance is provided, or in that line sections of variable length are provided. It is also possible that both the generator-side capacitor 51 and the generator-side inductivity 47 are variable. The generator-side capacitor 51 may be provided with a positioning motor which, when actuated, changes the distance between the two capacitor plates by, for example, moving one of the two capacitor plates in a straight line, with both capacitor plates always being parallel to one another, or one of the two capacitor plates being swiveled.

By changing the capacity of the capacitor 51 or of the inductivity 47, respectively, the resonance frequency of the generator resonant circuit 52 can be changed or tuned, respectively. If the resonance frequencies of the generator resonant circuit and the tool resonant circuit coincide, then the maximum electric power of the generator 18 is transferred to the tool resonant circuit 50 and thus to the tool capacitor 15, 16. By changing the resonance frequency of the generator resonant circuit 52, the transfer of the electric power can be controlled in a targeted manner, and the more the resonance frequencies of the two resonant circuits 50, 52 differ, the lower is the transferred power. Thus, the tuning of the generator resonant circuit 52 can be used in a targeted manner for adjusting the electric power introduced into the molding space 14.

In the present embodiment, the resonance frequency of the generator resonant circuit 52 is changed. It is equally possible to change the resonance frequency of the tool resonant circuit 50. This has the same effect with regard to the transfer of the electric power. However, it is more difficult to provide a tool-side capacitor than a generator-side variable capacitor or a variable inductivity, respectively.

Figure 5:
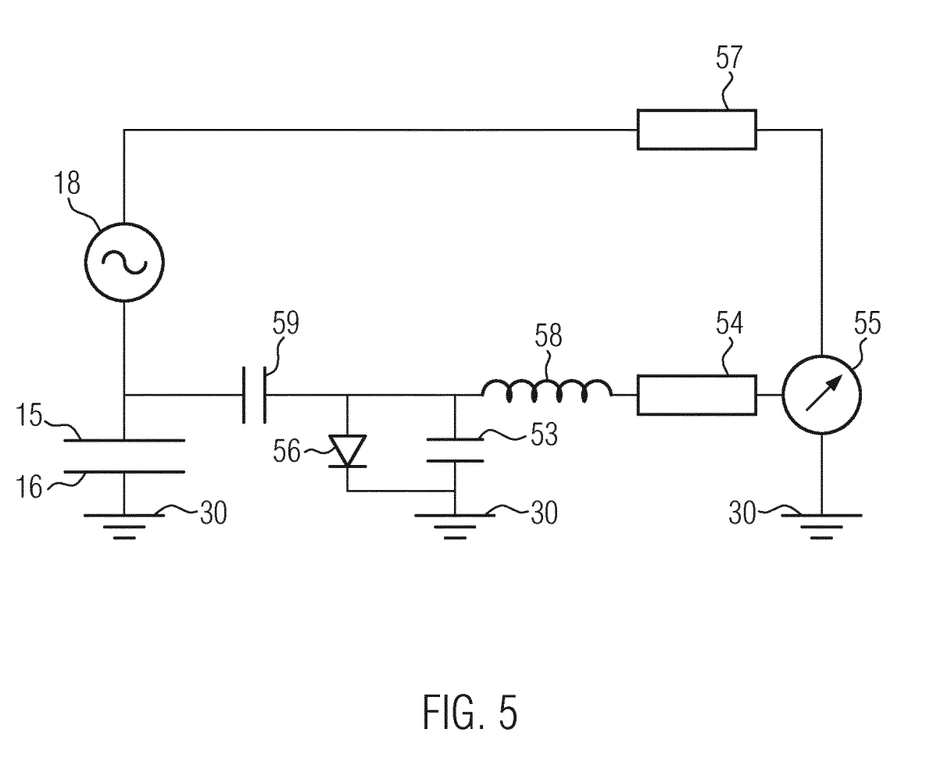

FIG. 5 shows a schematically simplified diagram of a device for controlling the electric power supplied to the tool capacitor 15, 16. The generator 18 is connected to the tool capacitor 15, 16. Connected in parallel to the tool capacitor is a measuring capacitor 53, the electric capacity of which is a fraction of the electric capacity of the tool capacitor 15, 16. The measuring capacitor 53 is connected to a voltage measuring device (voltmeter) 55 via a coaxial line 54. Preferably, a diode 56 is switched in parallel to the measuring capacitor 53. The coaxial line 54 is connected in series to an inductor 58, which serves for the filtering of high-frequency signals.

The measuring unit formed by the measuring capacitor 53 and the diode 56 is insulated from the tool capacitor 15, 16 by an insulating capacitor 59. The insulating capacitor has a high dielectric strength. The capacitance of the measuring capacitor 53 is less than the capacitance of the measuring capacitor 53, leading to a greater voltage drop at the insulating capacitor than at the measuring capacitor 53. The ratio of the capacitance of the insulating capacitor 59 to the capacitance of the measuring capacitor 53 is preferably 1:100 or 1:1000 or 1:10,000. By this means the voltage in the measuring unit 53, 55 applied at the tool capacitor 15, 16 is so reduced that it lies within a measuring range of the voltmeter 55, by which it may be reliably detected.

With this circuitry, a voltage is released at the measuring capacitor 53 which corresponds to the voltage applied at the tool capacitor 15, 16 and is reduced according to the ratio of the capacity of the insulating capacitor 59. By providing the diode 56, only the oscillation halves of a certain polarity occur. Thus, the diode 56 is a rectifier of the voltage applied to the measuring capacitor 53. The measuring voltage is measured with the voltage measuring device 55 and converted into a measurement signal. The measurement signal is forwarded to a control device 57 which automatically controls the generator 18 to deliver a predetermined electric power in order to generate a specific voltage at the tool capacitor, or to generate a specific measuring voltage at the measuring capacitor, respectively, which amounts to a fraction of the voltage at the tool capacitor.

Figure 6:
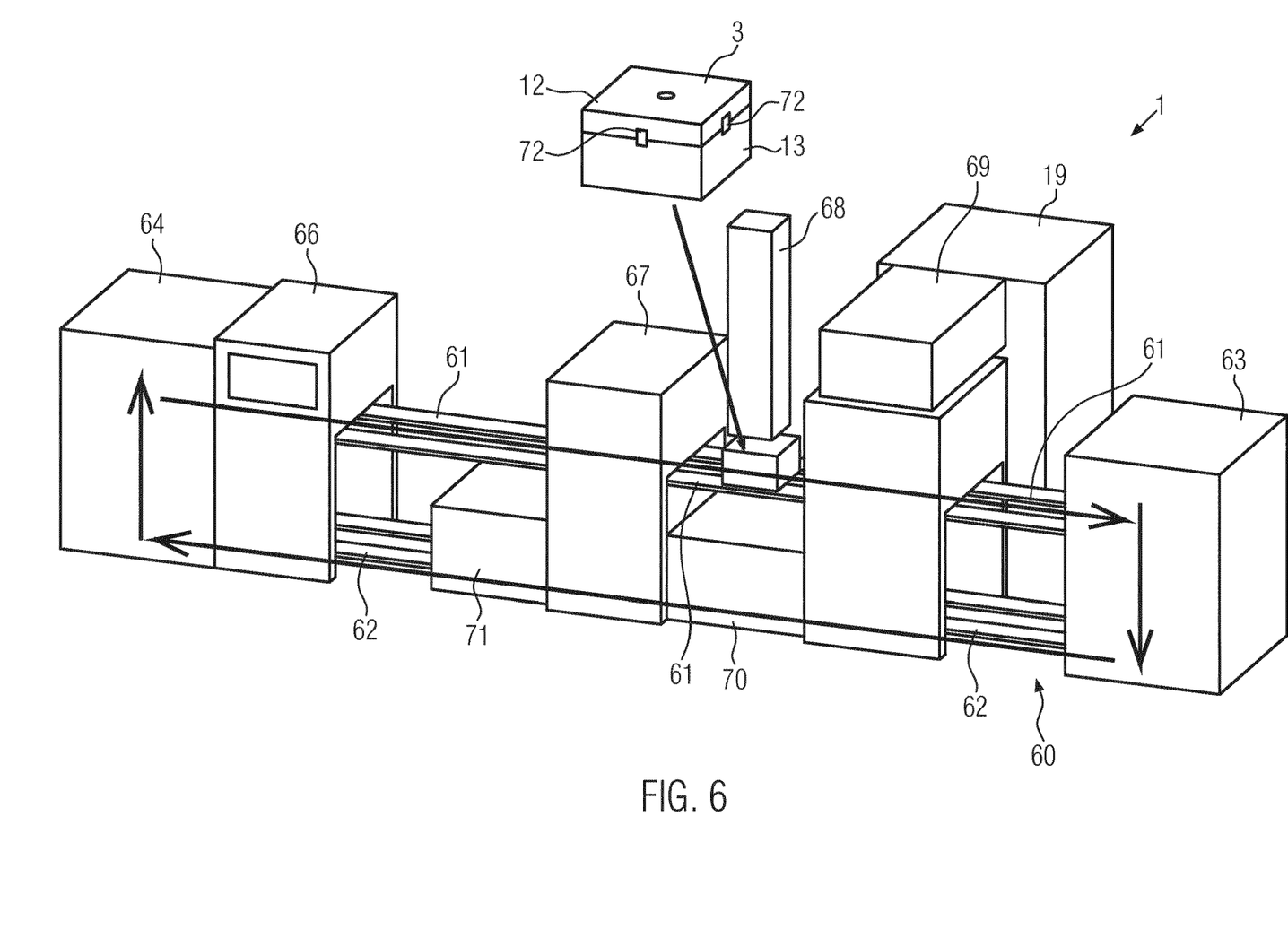

An embodiment of an apparatus for the manufacture of particle foam components is now explained below with the aid of FIG. 6. This apparatus 1 has several workstations, spatially separate from one another and connected to one another by a conveyor unit 60. With the conveyor unit 60, several molding tools, each defining a molding space, may be moved between the individual workstations.

The conveyor unit 60 has an upper conveyor section 61 and a lower conveyor section 62, on which the molding tools 3 are conveyed in different directions. The two conveyor sections 61, 62 are arranged parallel to one another, and at the ends of the two conveyor section there is in each case a lifting device 63, 64 by which the molding tools may be moved downwards (lifting device 63) or upwards (lifting device 64) between the conveyor levels. The two conveyor sections 61, 62 each have two narrow conveyor belts, arranged parallel to one another and on which the molding tools 3 may be placed.

Located on the upper conveyor section 61 are, in the direction of conveyance 65, a demolding station 66, an insertion station 67, a filling station 68 and a welding station 69. The welding station includes a press with a bottom stationary plate at the level of the upper conveyor section 61, and a top movable plate. Between the two plates (not depicted), in each case a molding tool 3 may be arranged and, by means of a press, which actuates the two plates, pressed together. The two plates are made of an electrically conductive material. The bottom, stationary plate is connected to ground. The top, movable plate is connected to an RF generator 18. The two plates thus form the capacitor plates 15, 16 described above, which accommodate the molding tool 3 between them.

Provided on the lower conveyor section 62 is a cooling section 70, on which the molding tools heated at the welding station 69, and the particle foam components located therein, may cool down. The cooling section 70 is able to cool the molding tools 3 with ambient air alone, but may be provided with a fan, in order to subject the molding tools 3 to a cooling airflow and/or may include a cold chamber which is cooled below room temperature by a cooled medium, in order to accelerate the heat transfer out of the molding tool 3. The cooling section 70 may hold several molding tools 3 simultaneously, since the cooling and/or stabilizing of the particle foam component in the molding tool is the working step of longest duration.

Provided on the lower conveyor section 62 is a molding tool storage system 71 which is connected to an automatic store for the storage of several molding tools, so that different molding tools may be fed into and taken out of the conveyor unit 60 automatically.

The manufacture of a particle foam component finishes in the demolding station 66, in which the molding tool comprised of two halves is opened and the particle foam component produced therein is removed and discharged.

The molding tools 3 have a closing mechanism 72, by which the two halves of the respective molding tool are firmly closed together when conveyed along the conveyor unit 60.

This closing mechanism 72 is opened automatically in the demolding station 66 for demolding of the particle foam component, after which the two mold halves are put together again and joined together by the closing mechanism 72. The closing mechanism joins the two mold halves so firmly that they do not move apart during conveyance. The closing mechanism may have a degree of play, so that the two mold halves may be pulled slightly apart during filling, in order to form a crack-gap. The closing mechanism must not be used to absorb the pressure occurring in the molding space during welding. This pressure is drawn off via the press in the welding station 69.

The advantage of this apparatus is that a very high throughput is possible with a single welding station, since the welding of a particle foam component generally lasts no longer than 30 seconds to 2 minutes. The working step of longest duration is the stabilizing or cooling down of the molding tool and the particle foam component contained within it. Since the cooling section is able to hold several molding tools simultaneously, several molding tools may be stabilized or cooled at the same time. This means that the processing of the molding tools into the welding station 69 is not held up.

A further advantage of this apparatus lies in the fact that different tools, in particular with different molding spaces, may be circulated simultaneously. Preferably each molding tool is provided with a unique machine-readable identification device. Such an identification device may be for example a barcode or an RFID chip. One or more suitable readers for reading the identification device are provided on the apparatus along the conveyor unit 60, so that a control unit (not depicted) knows which tool is present at which workstation. By this means, the individual tools may be dealt with individually. In particular, at the welding station, they may be subjected to electromagnetic waves of different voltage and/or duration. Individual control of the dwell time in the cooling section and the cooling effect under active cooling, for example using a fan, is also possible.

In comparison with a conventional apparatus for the manufacture of particle foam components, in which the foam particles are welded solely with hot steam, the present apparatus is much more compact and much more flexible, since it is able to process several different molding tools simultaneously. Moreover, energy may be introduced into the molding space with much greater efficiency by means of the electromagnetic radiation.

It may also be expedient to provide at the welding station a water or steam supply line, by which water and/or steam may be fed to the molding tool. This is especially advantageous when the foam particles to be welded have, at low temperatures or generally, only a low dielectric loss factor. In such a case, a limited amount of water or steam is supplied. By means of the electromagnetic radiation, the water is heated to steam, or the steam is heated further. In this way the foam particles are heated to a higher temperature at which the dielectric loss factor is greater, so that the electromagnetic radiation is absorbed and they are heated further. It has been found that just a few 100 g of water are sufficient for a molding space with a volume of 50 liters. If the foam particle material is for example ePS (expandable polystyrol), then 300 g of water or less are sufficient for heating and welding the foam particles in a molding space with a volume of 50 liters. In conventional welding, in which the foam particles are heated solely by hot steam, amounts of steam comprising several kilos of water are needed for a molding space with a volume of 50 liters.

It therefore applies in principle, if foam particles are to be welded which absorb electromagnetic radiation to only a limited extent, that a single addition of water amounting to 300 g is sufficient for a molding space with a volume of 50 liters. For many materials which absorb electromagnetic radiation only slightly, even small amounts of water may be adequate. For molding spaces with different volume, the maximum amount of water required may be matched to the volume in the same proportion.

If water is heated in the molding space using electromagnetic radiation, then it is expedient to use a molding tool which has a pressure sensor, by which the pressure prevailing in the molding space may be measured. This pressure is proportional to temperature. The irradiation of electromagnetic radiation is then controlled preferably in accordance with the measured pressure value, i.e. preferably set for a specific pressure value.

For this apparatus with the conveyor unit 60, the different aspects of the invention described above and in particular the different molding tools may be used individually or in combination.

| List of reference signs | |
|---|---|
| 1 | apparatus |
| 2 | material container |
| 3 | molding tool |
| 4 | line |
| 5 | base |
| 6 | compressed air line |
| 7 | compressed air source |
| 8 | jet nozzle |
| 9 | compressed air line |
| 10 | filling injector |
| 11 | compressed air line |
| 12 | molding half |
| 13 | molding half |
| 14 | molding space |
| 15 | capacitor plate |
| 16 | capacitor plate |
| 17 | electrical line |
| 18 | AC voltage source |
| 19 | low pressure pump |
| 20 | ventilator |
| 21 | cooling fin |
| 22 | heating wire |
| 23 | power source |
| 24 | base body |
| 25 | base body |
| 26 | inner boundary surface |
| 27 | inner boundary surface |
| 28 | coating |
| 29 | coating |
| 30 | ground |
| 31 | bottom wall |
| 32 | side wall |
| 33 | filling opening |
| 34 | ventilation opening |
| 35 | housing |
| 36 | piston/cylinder unit |
| 37 | bottom wall |
| 38 | side wall |
| 39 | tappet |
| 40 | stop plate |
| 41a | opening |
| 41b | door |
| 42 | insulating body |
| 43 | insulating body |
| 44 | mount |
| 45 | insulating body |
| 46 | line |
| 47 | generator-side inductor |
| 48 | tool-side inductor |
| 49 | tool-side capacitor |
| 50 | tool resonant circuit |
| 51 | generator-side capacitor |
| 52 | generator resonant circuit |
| 53 | measuring capacitor |
| 54 | coaxial line |

| List of reference signs | |
|---|---|
| 55 | voltmeter |
| 56 | diode |
| 57 | control device |
| 58 | inductor |
| 59 | isolating capacitor |
| 60 | conveyor unit |
| 61 | upper conveyor section |
| 62 | lower conveyor section |
| 63 | lifting device |
| 64 | lifting device |
| 65 | direction of conveyance |
| 66 | demoulding station |
| 67 | insertion station |
| 68 | filling station |
| 69 | welding station |
| 70 | cooling section |
| 71 | molding tool storage system |
| 72 | closing mechanism |

The invention claimed is:

1. Apparatus for the manufacture of a particle foam component, comprising: a material container containing foam particles; a filling injector for applying compressed air to flow the foam particles from the material container; a radio frequency radiation source for generating radio frequency electromagnetic radiation; a molding tool that limits a molding space and that is configured for tempering a surface limiting the molding space, wherein adjacent to the molding space, at least two capacitor plates are arranged which are connected to the radiation source for the electromagnetic radiation; the molding space receiving the flow of the foam particles from the filling injector; and the molding tool is formed of at least two molding halves, wherein the at least two molding halves define the molding space each by means of an inner boundary surface and at least one of the at least two molding halves is made from an electrically conducting material and forms one of the capacitor plates, wherein at least one inner boundary surface of the electrically conducting material has an inner boundary surface with a contoured configuration which deviates from a planar surface and the radio frequency radiation source applies electromagnetic RF radiation to the molding space via the capacitor plates to heat and weld the foam particles into the particle foam component, wherein one of the at least two molding halves has a passage opening for introducing the foam particles from the filling injector, the passage opening being covered up by another of the at least two molding halves in a closed state of the molding tool.

2. The apparatus according to claim 1,
wherein
both molding halves are made from an electrically conducting material, each forming one of the capacitor plates, wherein at least in the region in which the two molding halves are in contact with each other, an insulating layer for electrical insulation of the two molding halves is arranged.

3. The apparatus according to claim 1,
wherein
the at least one electrically conducting molding half is provided with a plastic coating on its side limiting the molding space.

4. The apparatus according to claim 3,
wherein
the plastic coating has a maximum thickness of 1 centimeter.

5. The apparatus according to claim 3,
wherein
the plastic coating is made from a material which is not transparent to electromagnetic radiation.

6. The apparatus according to claim 1, wherein the filling injector is coupled to one of the electrically conducting molding halves, wherein the electrically conducting molding half coupled to the filling injector and the filling injector are electrically connected to ground.

7. The apparatus of claim 1, wherein the molding space is filled with foam particles, which are welded by application of the electromagnetic radiation.

8. The apparatus of claim 7, wherein the emitting of electromagnetic radiation is controlled such that the foam particles have a temperature above a softening temperature for the foam particles.

9. The apparatus of claim 1, wherein the molding tool is configured for welding foam particles with no steam generator and no steam supply to the molding space.

10. The apparatus of claim 1, further comprising a steam generator.

11. Apparatus for the manufacture of a particle foam component, comprising: a molding tool that limits a molding space, wherein adjacent to the molding space, at least two capacitor plates are arranged which are connected to a radiation source for electromagnetic radiation, wherein the radiation source for electromagnetic radiation is designed for emitting electromagnetic radiation, and the molding tool is formed of at least two molding halves, wherein the at least two molding halves define the molding space each by means of an inner boundary surface and at least one of the at least two molding halves is made from an electrically conducting material and forms one of the capacitor plates, wherein at least one inner boundary surface of the electrically conducting material has an inner boundary surface with a contoured configuration which deviates from a planar surface; a material container containing foam particles; and a filling injector for introducing the foam particles from the material container to the molding tool; wherein the radiation source applies electromagnetic RF radiation to the molding space via the capacitor plates to heat and weld the foam particles into the particle foam component and wherein one of the at least two molding halves has a passage opening for introducing the foam particles from the filling injector, the passage opening being covered up by another of the at least two molding halves in a closed state of the molding tool.

12. The apparatus of claim 11,
wherein
both molding halves are made from an electrically conducting material, each forming one of the capacitor plates, wherein at least in the region in which the two molding halves are in contact with each other, an insulating layer for electrical insulation of the two molding halves is arranged.

13. The apparatus of claim 11, wherein a surface limiting the molding space is configured for being tempered.

14. The apparatus of claim 11, wherein the molding tool is configured for welding foam particles with no steam generator and no steam supply to the molding space.

15. The apparatus of claim 11, wherein the foam particles are loose foam particles.

16. Apparatus for the manufacture of a particle foam component, comprising: a material container containing foam particles; a filling injector for applying compressed air to flow the foam particles from the material container; a molding tool that limits a molding space, wherein adjacent to the molding space, at least two capacitor plates are arranged which are connected to a radiation source for electromagnetic radiation, wherein the radiation source for electromagnetic radiation is designed for emitting electromagnetic radiation, and the molding tool is formed of at least two molding halves, wherein the at least two molding halves define the molding space each by means of an inner boundary surface and at least one of the at least two molding halves is made from an electrically conducting material, forms one of the capacitor plates, wherein at least one inner boundary surface of the electrically conducting material has an inner boundary surface with a contoured configuration which deviates from a planar surface, wherein the molding tool is configured for receiving the foam particles form the material container and welding the foam particles with no steam generator and no steam supply to the molding space by the radiation source applying electromagnetic radiation to the molding space via the capacitor plates to heat and weld the foam particles into the particle foam component and wherein one of the at least two molding halves has a passage opening for introducing the foam particles from the filling injector, the passage opening being covered up by another of the at least two molding halves in a closed state of the molding tool.

17. The apparatus of claim 16,
wherein
both molding halves are made from an electrically conducting material, each forming one of the capacitor plates, wherein at least in the region in which the two molding halves are in contact with each other, an insulating layer for electrical insulation of the two molding halves is arranged.

18. The apparatus of claim 16, wherein a surface limiting the molding space is configured for being tempered.

19. The apparatus of claim 16, wherein the filling injector introduces the foam particles to the molding tool.

* * * * *